(12) United States Patent
Kifuku et al.

(10) Patent No.: US 7,019,486 B1
(45) Date of Patent: Mar. 28, 2006

(54) MOTOR CONTROL DEVICE

(75) Inventors: Takayuki Kifuku, Tokyo (JP);
Katsuhiko Ohmae, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/074,753

(22) Filed: Mar. 9, 2005

(30) Foreign Application Priority Data

Sep. 10, 2004 (JP) ............................ 2004-264190

(51) Int. Cl.
*H02P 7/36* (2006.01)
(52) U.S. Cl. ....................... 318/806; 318/767; 318/798
(58) Field of Classification Search ................ 318/806, 318/798, 767
See application file for complete search history.

(56) References Cited

U.S. PATENT DOCUMENTS

| | | | |
|---|---|---|---|
| 4,195,233 A * | 3/1980 | Udvardi-Lakos | 307/66 |
| 4,607,205 A * | 8/1986 | Kito et al. | 318/778 |
| 4,660,671 A * | 4/1987 | Behr et al. | 180/446 |
| 5,072,354 A * | 12/1991 | Katto et al. | 363/41 |
| 5,532,569 A * | 7/1996 | Tanamachi et al. | 318/802 |
| 5,680,302 A * | 10/1997 | Iwata et al. | 363/132 |
| 6,392,854 B1 * | 5/2002 | O'Gorman | 361/31 |
| 6,512,341 B1 * | 1/2003 | Matsushiro et al. | 318/254 |
| 2005/0047035 A1 * | 3/2005 | Vallinmaki et al. | 361/42 |

FOREIGN PATENT DOCUMENTS

JP     62-198563 A     9/1987

\* cited by examiner

*Primary Examiner*—Rita Leykin
(74) *Attorney, Agent, or Firm*—Sughrue Mion, PLLC

(57) ABSTRACT

A control device of a motor used in, for example, electric power steering control of a vehicle has to monitor the operation thereof to execute such a processing as stopping the control without delay upon detection of error. However, conventional monitoring devices have a disadvantage of taking a long time period the detection or not being able to detect an error of no output. A three-phase inverter circuit 52 having a substantially constant operation period is employed. The inverter 52 outputs an output waveform also at the moment of not driving the motor 2. An inverter period monitoring circuit 555 is provided to monitor a period of the output waveform. When the period comes to be too large or too small as compared with a carrier period of the inverter, an alarm is outputted, and control of the inverter is stopped.

14 Claims, 5 Drawing Sheets

MOTOR CONTROL DEVICE

BACKGROUND OF THE INVENTION

1. Field of the Invention

The present invention relates to a motor control device and, more particularly, to a control device of a motor acting to assist in driving a steering wheel of a vehicle.

2. Description of the Related Art

In the description hereinafter, an electric steering device that adds an assisting power to a steering device of a vehicle is taken as an example. However, the present invention is not limited to a steering device, but may be applied generally to a control device functioning to drive an electric motor with an inverter from a DC power supply.

As for an electric power steering device of vehicles, it is foreseen that the occurrence of error in the control device of a motor during the operation (generally an inverter is used) immediately invites dangerous situations, so that it is desirable to detect the error as soon as possible, for example, within one cycle of the inverter.

The following motor control device is disclosed in the Japanese Patent No. 2501030. With reference to FIGS. 1 and 3(b) of this Japanese Patent, a terminal voltage of a motor to be driven by an inverter is monitored and, further, with reference to FIGS. 1 and 3(a), a drive signal of switching element that drives the motor is monitored. In this motor control device, when the state of those inverter and switching element driving the motor continues for not less than a predetermined time period, an error is determined, and the feed of an electric power to the motor drive circuit is interrupted.

In the art of this Japanese Patent No. 251030, an output state only when a drive circuit makes outputs is monitored, so that a state of no output is not determined to be abnormal. However, the fault that a drive circuit cannot make outputs takes place relatively often as a mode of faults. Therefore, it cannot be said that this motor control device detects various faults with accuracy, thus a disadvantage exists in that this device is not always useful in practical use.

Moreover, in the case where a drive circuit continues to make outputs for a long time period takes place during actual driving, it is sometimes the case that a return torque is exerted on a steering wheel at all times, for example, as a result of running at high speed on a circular test course. To prevent the malfunction in such a case, it is necessary to set a time period on which an error is determined to be rather long. Consequently, a further disadvantage exists in that it takes a long time period to determine the error.

Furthermore, the motor control device disclosed in the mentioned Japanese Patent No. 2501030 shows only the case where a drive circuit is a single-phase inverter. Thus, a yet further disadvantage exists in that this drive circuit is not always effective in the case of a three-phase or poly-phase inverter.

SUMMARY OF THE INVENTION

Since the mentioned conventional motor control device is arranged as described above, a problem exists in that errors cannot be detected in the case of such a type of fault that no output is sent from a drive apparatus to a motor, or in the case where an output voltage from a motor drive circuit is fixed at L level due to ground fault or short circuit fault in the internal part of the motor or in wiring to the motor. Moreover, another problem exists in that the application method in the case where a drive circuit is a three-phase inverter is not shown. A further problem exists in that it takes a long time period to determine an error.

The invention was made to solve the above-discussed problems, and has an object of obtaining a motor control device in which a drive circuit is a three-phase inverter operating in a substantially constant period, and which is provided with a monitoring circuit capable of detecting an error even in the case of such a type of fault that no output is sent from a drive apparatus to a motor or in the case where an output voltage from a motor drive circuit is fixed at L level due to ground fault or short circuit fault in the internal part of the motor or in wiring to the motor.

The invention has a further object of obtaining a motor control device enabling the determination of error in a short time period, for example, about one periodic time of an inverter.

A motor control device according to the invention includes:

a poly-phase inverter of not less than three phases that is connected to a DC power supply having a voltage H of a vehicle, and performs a PWM operation controlled at a predetermined range of output duty ratio in a substantially constant carrier period, whereby there exists a period in which all voltages of output phase come to be 0 in synchronization or H in synchronization during one periodic time;

an inverter period monitoring circuit that monitors a periodic time of an output voltage waveform of the mentioned inverter, and that determines a fault of the mentioned inverter and outputs a signal when the mentioned periodic time comes to be not less than a predetermined magnification or not more than a predetermined magnification with respect to the mentioned carrier period; and an alarm circuit that gives a notice of alarm with the mentioned signal to a driver who operates the mentioned vehicle.

According to the invention, it is possible to detect an error of a three-phase inverter or error of a micro-controller within a time period nearly equal to a PWM carrier period with a simple circuit arrangement, resulting in improvement in safety of the vehicle.

The foregoing and other objects, features, aspects and advantages of the present invention will become more apparent from the following detailed description of the present invention when taken in conjunction with the accompanying drawings.

DETAILED DESCRIPTION OF THE INVENTION

Embodiment 1

Figure 1:
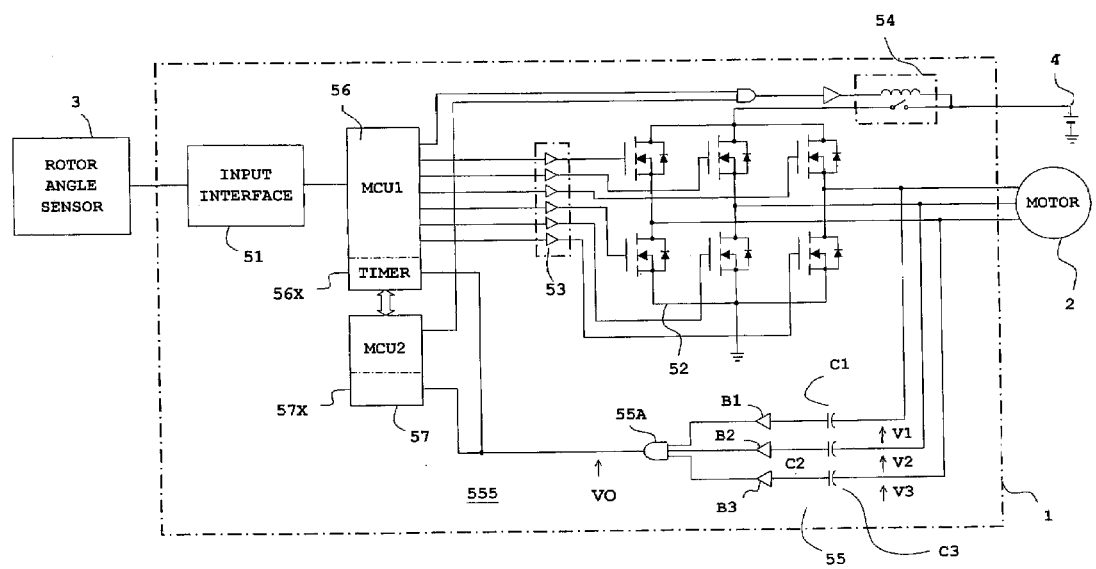
FIG. 1 is a block diagram of a motor control device according to a first preferred embodiment of the present invention.

FIG. 1 is a block diagram of a motor control device according to a first preferred embodiment of the present invention. Referring to the drawing, a motor 2 is mounted onto a steering device of a vehicle, not shown, and is connected to an output terminal of a motor control device (hereinafter, it may be referred to as "controller" as well) 1 that is fed with an electric power from a battery 4 of the vehicle. The motor 2 is a DC brushless motor. Furthermore, to excite a phase corresponding to an angle position of a magnetic pole of the motor 2, the motor control device receives signals from a rotor angle sensor 3 that detects a rotor angle of the motor 2. In addition, the rotor angle sensor 3 is shown as an example of a supply source of signals, and a signal supply source is not limited to this rotor angle sensor 3.

The controller 1 includes an interface 51 that receives signals from the outside; a first micro-controller 56 that executes the control based on outputs from an interface 51; a gate drive circuit 53 that is controlled by the first micro-controller 56; a three-phase inverter circuit 52 that is controlled by the gate drive circuit 53, and drives the motor 2; switch means 54, e.g., relay for interrupting the feed of power from the battery 4 to the three-phase inverter 52; an output voltage monitoring circuit 55 that picks up an output voltage from the three-phase inverter 52, and inputs periods thereof to the first micro-controller 56 as a waveform capable of being measured; and a second micro-controller 57 for monitoring/inspecting an electric power steering device containing the first micro-controller 56. Although a tree-phase inverter is described as an example herein, the same description can be made with respect to any polyphase inverter of not less than three phases.

Both first and second micro-controllers 56, 57, in addition to the execution of the above-described respective controls, measure a period of waveforms, which the inverter period monitoring circuit 55 outputs, based on their own clock signal periods respectively. The output voltage monitoring circuit 55, the above-described period measurement circuits, not shown, of the first and second micro-controllers 56, 57, and a section that executes processing such as alarm output that is made after the detection of error form a so-called inverter period monitoring circuit 555 according to the invention. For conveniences of description, a voltage of the battery 4 is established to be H volt.

The three-phase inverter circuit 52 outputs a voltage waveform on a regular basis irrespective of whether or not a steering wheel is being turned, or irrespective of whether or not the motor 2 generates a torque during an engine key, not shown, of this vehicle being ON.

The output voltage monitoring circuit 55 includes capacitors C1, C2, C3 that are connected to output terminals V1, V2, V3 of the three-phase inverter circuit 52, buffers B1, B2, B3 that are connected to these capacitors, and an AND gate 55A that receives outputs from the buffers B1, B2, B3.

An output from the AND gate 55A are inputted to the first and second micro-controllers 56, 57.

Now, operations of the motor control device of FIG. 1 are described. The first micro-controller 56 executes the control of outputting a signal to the gate drive circuit 53 based on a rotor angle signal generated by the rotor angle sensor 3, converting a DV voltage that is supplied form the battery 4 to a three-phase AC voltage with the three-phase inverter circuit 52, and supplying this three-phase AC voltage to the motor 2.

The method of driving an inverter of the three-phase inverter circuit 52 is executed by mutually driving upper and lower switching elements that form each arm based on the so-called PWM of triangle wave comparison. A duty ratio of driving each arm is limited within a predetermined range so as not to be a value close to 0% and not to be a value close to 100% (for example, it is controlled so as to be not less than 5% and not more than 95%). As a result, without regard to a value of outputs, there is a time period in which all voltages of each phase come to be L or H during one period. An AND gate 55A of the output voltage monitoring circuit 55 outputs H (voltage of the battery) to an output terminal VO when all voltages of each phase come to be H, while outputs L (herein, 0 volt) other than this case.

Figure 2:
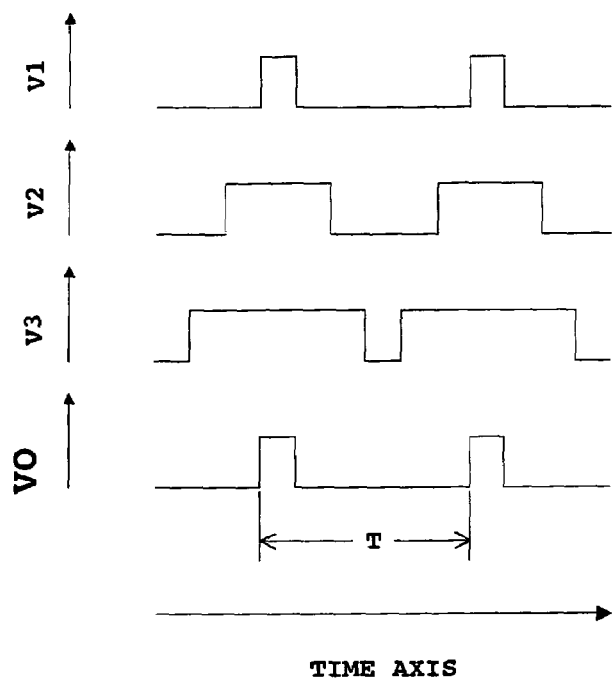
FIG. 2 is a chart showing a waveform of each section at the normal time of the motor control device of FIG. 1.

FIG. 2 is an output waveform chart of the three-phase inverter circuit 52 for explaining operations of the output voltage monitoring circuit 55 of FIG. 1. An output voltage VO from the output voltage monitoring circuit 55 comes to be H during a time period in which output phase voltages V1, V2, V3 from the three-phase inverter 52 are H. A period T of VO (for example, a time period between rise edges of VO) is a PWM carrier period (taken as t) of the three-phase inverter circuit 52, and herein is substantially a constant value as described above. The first micro-controller 56 measures the period T of an output from the output voltage monitoring circuit 55 with a timer 56X contained therein, not shown, and determines that it is normal on the supposition that T is within a predetermined range. A predetermined range herein is preferably a range, for example, 0.5 to twice as long as a period t of a carrier frequency of the three-phase inverter circuit 52.

Figure 3:
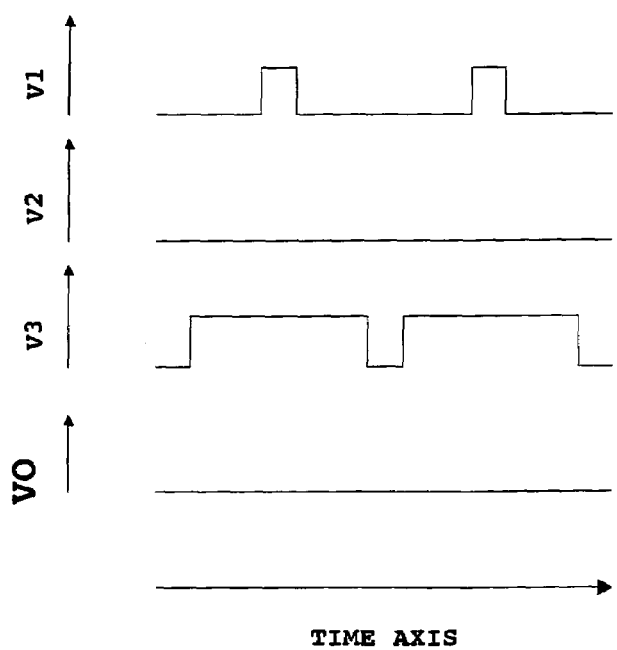
FIG. 3 is a chart showing a waveform of each section at the time of error of the motor control device of FIG. 1.

When any fault such as output ground fault on the way of wiring to the motor 2 occurs (for example, when the ground fault takes place on V2 line as shown in FIG. 3), VO becomes constant at L level, and T is out of the mentioned predetermined range (no signal is outputted to VO in the case of FIG. 3) and the first micro-controller 56 determines it is abnormal.

Each output terminal of the three-phase inverter 52 is AC-coupled to the output voltage monitoring circuit 55 via the capacitors C1, C2, C3. Even if each phase voltage is constant at H level or at L level, input voltages to the mentioned buffers B1, B2, B3 come to be at L level, thereby enabling to detect errors.

When the output voltage monitoring circuit 55 determines an error, the first micro-controller 56 opens the switch means 54 and instructs output interruption to the three-phase inverter circuit 52 via the gate drive circuit 53 (or stops outputting a control signal to the gate drive circuit 53). Further, a driver will be notified of the error with an alarm, not shown. In this manner, even in the case of such a type of fault that any output is not sent from the three-phase inverter circuit 52, it is possible to avoid the danger of continuing to drive without being informed of the occurrence of error.

In the meantime, the second micro-controller 57 receives the signal VO of the output voltage monitoring circuit 55 as well. When a period of this signal is measured based on a period of an internal clock in the same manner as described above and is compared with the mentioned magnification having been (preliminarily determined eventually to judge a fault, the second micro-controller 57 opens the switch means 54, interrupts the supply of power source to the three-phase inverter 52 and inhibits it from sending outputs in the same manner as in the first micro-controller 56. The switch means 54 is arranged to ON drive based on AND of the instruction of the first micro-controller 56 and the instruction of the second micro-controller 57 (that is, becomes ON only when both of them instruct ON). Accordingly, even if the first micro-controller 56 makes the ON instruction of the switch means 54, the second micro-controller can make the OFF instruction (vice versa). Thus, it is possible to prevent the motor 2 from being abnormally energized due to run-away of the first micro-controller 56.

In addition, instead of interrupting the feed of an electric power to the three-phase inverter circuit 52, the similar effect can be obtained with the arrangement of interrupting power supply to the gate drive circuit 53. In the case of the fault that any element of the three-phase inverter circuit 52 is brought in short circuit, outputs are continuously sent even after the power supply to the gate drive circuit 53 has been interrupted, and therefore it becomes necessary to detect this fault itself with another detection means. It is, however, possible to use, for example, a semi-conductor switching element of smaller current capacity as the switch means 54.

Furthermore, instead of monitoring an output voltage from the three-phase inverter 52, the similar effect can be obtained with the arrangement of monitoring outputs from the gate drive circuit 52 or output ports of the first micro-controller 56. Although it is difficult to detect a fault that an error takes place in inverter output (for example, element fault) despite that there is no error in outputs from the gate drive circuit 53 or in output ports of the first micro-controller 56, it is possible to monitor signals of less noise easily as compared with the case of directly monitoring a power section, which results in stable operation.

In the explanation of FIG. 1, a period T of the output voltage monitoring circuit 55 is monitored with an internal clock of the first micro-controller 56. However, for example, in the case of run-away of the first micro-controller, a PWM period t comes to be shorter, and the internal clock also goes wrong, resulting in the possibility that the first micro-controller 56 detects no error. Even in such a case, the second micro-controller 57 detects the error, so that it is possible to detect the error as a whole system. Thus, a PWM period is measured on the basis of a clock itself that generates a periodic time of PWM, and further a PWM period is measured on the basis of a clock different from the clock that generates a periodic time of PWM, thereby improving reliability of the system.

In addition, to prevent detection of any error during a time period from the time of starting a vehicle (shortly after an engine key being ON) until the three-phase inverter circuit 52 has got in the stable operation, it is a matter of course that a waiting time is secured in monitoring sequence of the first and second micro-controllers 56, 57.

Embodiment 2

Figure 4:
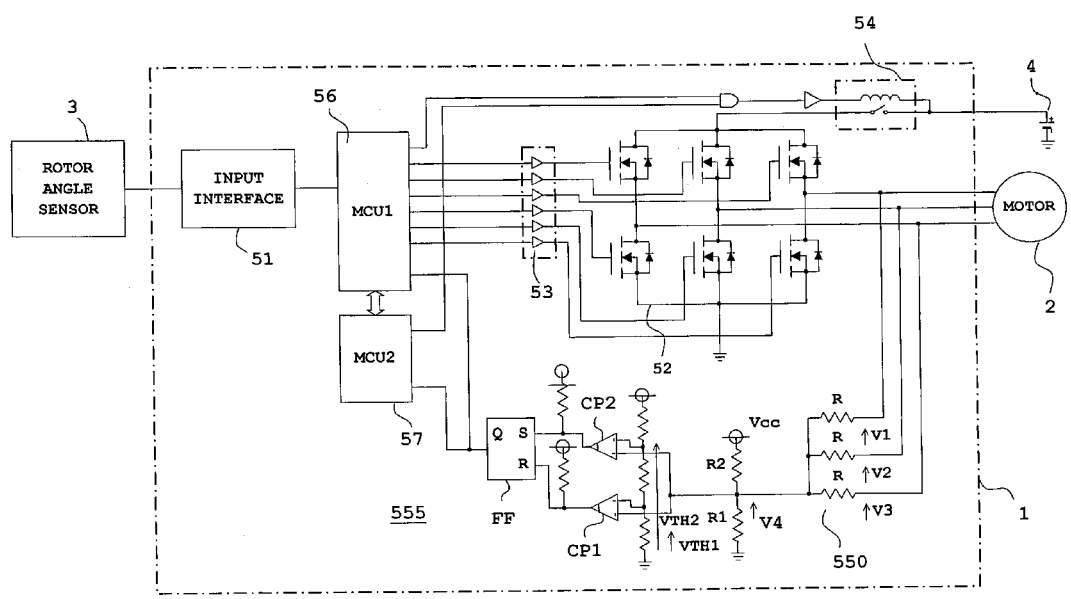
FIG. 4 is a block diagram of a motor control device according to a second embodiment of the invention.

FIG. 4 is block diagram of a motor control device according to a second embodiment of the invention. In the drawing, the same reference numerals indicate the same or like parts as those in FIG. 1, and detailed description thereof is omitted. With reference to FIG. 4, an output voltage monitoring circuit 550 includes: resistors of the same value as output terminals V1, V2, V3 of a three-phase inverter circuit 52 to which the resistors are connected (all resistors are referred to as R); a resistor R2 applying an arbitrary bias; first and second comparators CP1, CP2 connected to these resistors; and a flip-flop FF receiving outputs from the comparators CP1, CP2.

As compared with the output voltage monitoring circuit 55 of FIG. 1 according to the foregoing first embodiment, the output voltage monitoring circuit 550 of FIG. 4 is DC-coupled to power feed lines of the motor 2 with the three resistors R.

The output voltage monitoring circuit 550 monitors a voltage obtained by addition of all voltages of each phase. That is, letting each phase voltage be V1, V2, V3, and an input voltage to the comparators CP1, CP2 be V4, then $V_{cc}$ is a predetermined constant voltage, for example, a power supply voltage.

Letting {a resistance value obtained by connecting R1 and (⅓)·R in parallel} be Z, $$R'=Z/\{R2+Z\} \quad (1)$$

Letting {a resistance value obtained by connecting R1, R2, and (½)·R in parallel} be Z, $$R'\{Y\}/\{R+Y\} \quad (2)$$

then, $$V4=R'V_{cc}+R'(V1+V2+V3) \quad (3)$$

Figure 5:
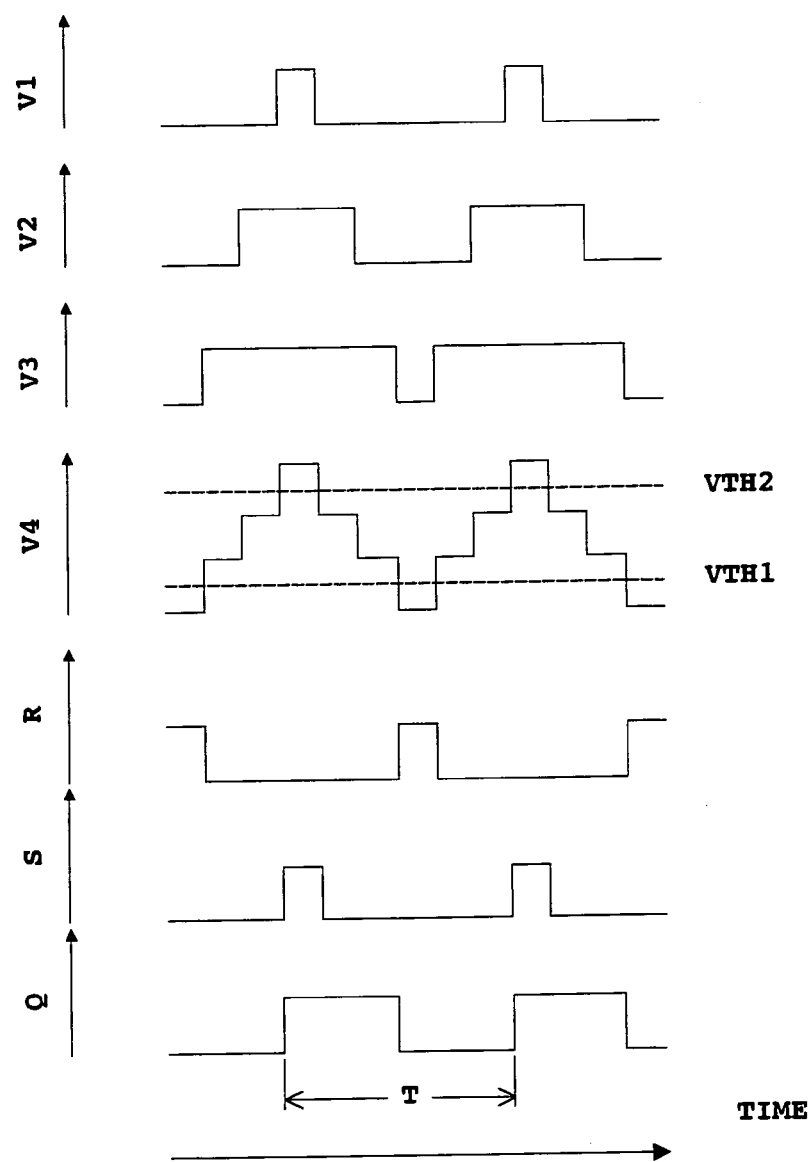
FIG. 5 is a chart showing a waveform of each section at the normal time of the motor control device of FIG. 4.
Figure 6:
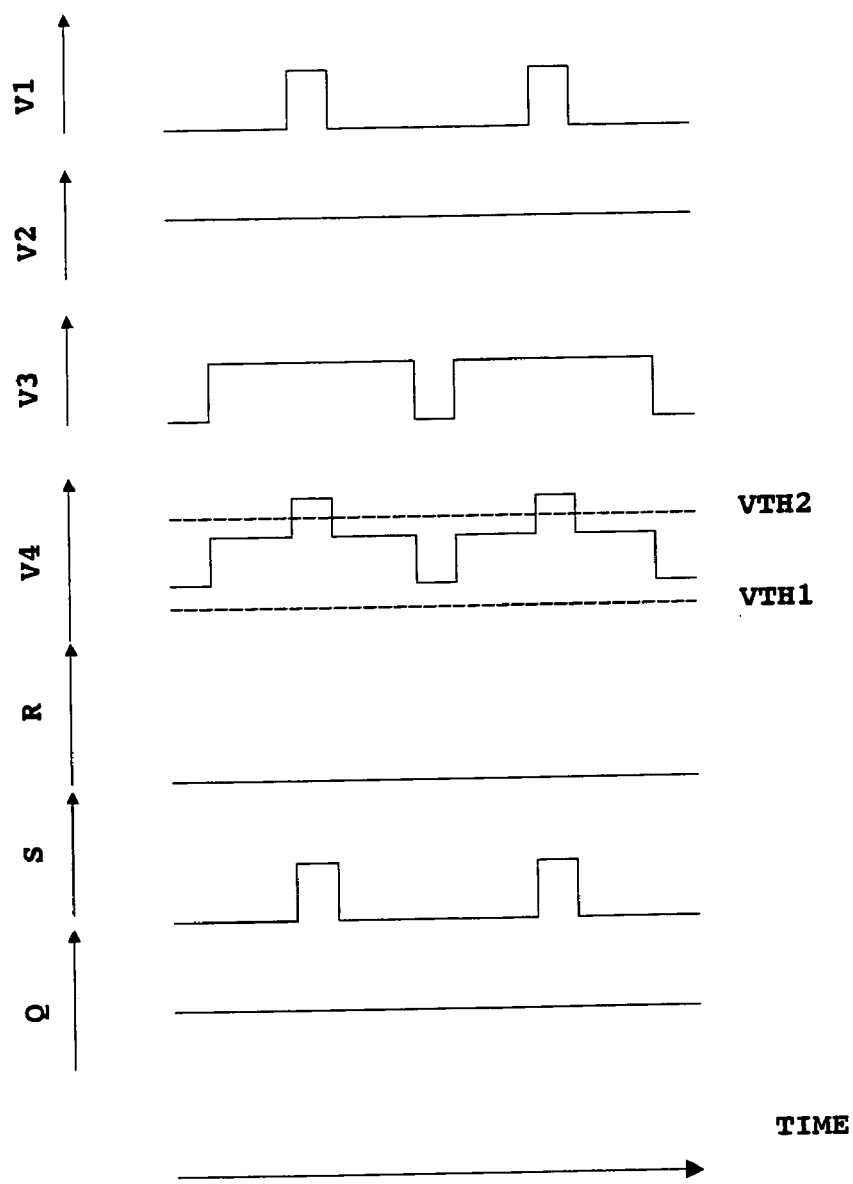
FIG. 6 is a chart showing a waveform of each section at the time of error of the motor control device of FIG. 4.

The above-mentioned V4 is compared with voltages of VTH1, VTH2 having been preliminarily set, and a waveform thereof is shaped. Thereafter, an output from one comparator is inputted to a set terminal S of the flip-flop FF, and an output from the other comparator is inputted to a reset terminal R of the flip-flop FF. The voltages of VTH1, VTH2 are at a level appropriate to cut off the peak of a waveform of V4 obtained by the addition of V1, V2, V3 as indicated in FIGS. 5 and 6. It is a matter of course that this level depends on a voltage of the battery 4, thus enabling to determine it preliminarily.

In the normal case, as shown with Q of FIG. 5, a rise edge can be obtained from the flip-flop FF with a PWM carrier period T, and it is possible to determine a fault depending on whether or not a period is out of a predetermined range in the same manner as in the foregoing first embodiment. On the other hand, at the time of an error such as ground fault on the output side of the three-phase inverter circuit 52, VO comes not to exceed either threshold value of VTH1 or VTH2, as shown in FIG. 6, and an output from the flip-flop is not inverted. Thus, it is possible to detect the error.

In the descriptions heretofore, a motor acting to assist turning a steering wheel of a vehicle is taken as an example. However, the motor control device according to the invention is not limited to the one that can be mounted onto a vehicle, and can be applied to any other control devices, on conditions that the motor control device is driven by an inverter of a substantially constant period, and a duty ratio of driving each arm is limited to be in a predetermined range from a value not close to 0% up to a value not close to 100%, and that as a result there is a time period in which all voltages of each phase come to be L or H during one periodic time without regard to a value of output.

It is to be understood that the invention is not limited to the above-mentioned embodiments and that various changes and modifications may be made without departing from the technical scope of the invention.

What is claimed is:
1. A motor control device comprising:
   a poly-phase inverter of not less than three phases that is connected to a DC power supply having a voltage H of a vehicle, and performs a PWM operation controlled at a predetermined range of output duty ratio in a substantially constant carrier period, whereby there exists a period in which all voltages of output phase come to be 0 in synchronization or H in synchronization during one periodic time;

an inverter period monitoring circuit that monitors a periodic time of an output voltage waveform of said inverter, and that determines a fault of said inverter and outputs a signal when said periodic time comes to be not less than a predetermined magnification or not more than a predetermined magnification with respect to said carrier period.

2. The motor control device according to claim 1, wherein said inverter period monitoring circuit monitors a periodic time in which a state that all outputs of said poly-phase are said H is repeated.

3. The motor control device according to claim 1, wherein said inverter period monitoring circuit monitors a periodic time in which a state that all outputs of said poly-phases are 0 is repeated.

4. The motor control device according to claim 1, wherein said inverter includes a clock generating a carrier period of said PWM, and said inverter period monitoring circuit measures a period of said inverter, letting said clock be a reference.

5. The motor control device according to claim 1, wherein said inverter includes a clock generating a carrier period of said PWM, and said inverter period monitoring circuit measures a period of said inverter, letting another clock having a period different from a period of said clock be a reference.

6. The motor control device according to claim 2, wherein said inverter period monitoring circuit includes: a plurality of capacitors of which one ends are connected to a plurality of AC output terminals of said inverter respectively; an AND circuit that is connected to the other ends of said plurality of capacitors, and outputs a signal when all voltages of said AC terminals are said H; and a period measurement circuit measuring a period of an output from said AND circuit.

7. The motor control device according to claim 3, wherein said inverter period monitoring circuit includes: a plurality of capacitors of which one ends are connected to a plurality of AC output terminals of said inverter respectively; an AND circuit that is connected to the other ends of said plurality of capacitors, and outputs a signal when all voltages of said AC terminals are 0; and a period measurement circuit measuring a period of an output from said AND circuit.

8. The motor control device according to claim 2, wherein said inverter period monitoring circuit includes: a plurality of resistors of which one ends are connected to a plurality of AC output terminals of said inverter respectively; an AND circuit that is connected to the other ends of said plurality of resistors, and that outputs a signal when all voltages of said AC terminals are said H; and a period measurement circuit measuring a period of an output from said AND circuit.

9. The motor control device according to claim 3, wherein said inverter period monitoring circuit includes: a plurality of resistors of which one ends are connected to a plurality of AC output terminals of said inverter respectively; an AND circuit that is connected to the other ends of said plurality of resistors, and that outputs a signal when all voltages of said AC terminals are 0; and a period measurement circuit measuring a period of an output from said AND circuit.

10. The motor control device according to claim 1, wherein said inverter period monitoring circuit includes a first micro-controller that provides a control signal to said inverter, and a second micro-controller measuring a period of said inverter, letting its own clock signal be a reference.

11. The motor control device according to claim 10, wherein said first micro-controller is arranged to stop the control of said inverter when the second micro-controllers determines that a period of an output voltage from said inverter is abnormal.

12. The motor control device according to claim 10, wherein a switch means stopping the feed of an electric power to said inverter when the second micro-controllers determines that a period of an output voltage from said inverter is abnormal.

13. The motor control device according to claim 1, wherein said duty ratio is not less than 5% and not more than 95%.

14. The motor control device according to claim 1, wherein a predetermined magnification of said period is not less than twice times and not more than zero point five times a carrier period of said inverter.

* * * * *